Figure 1:
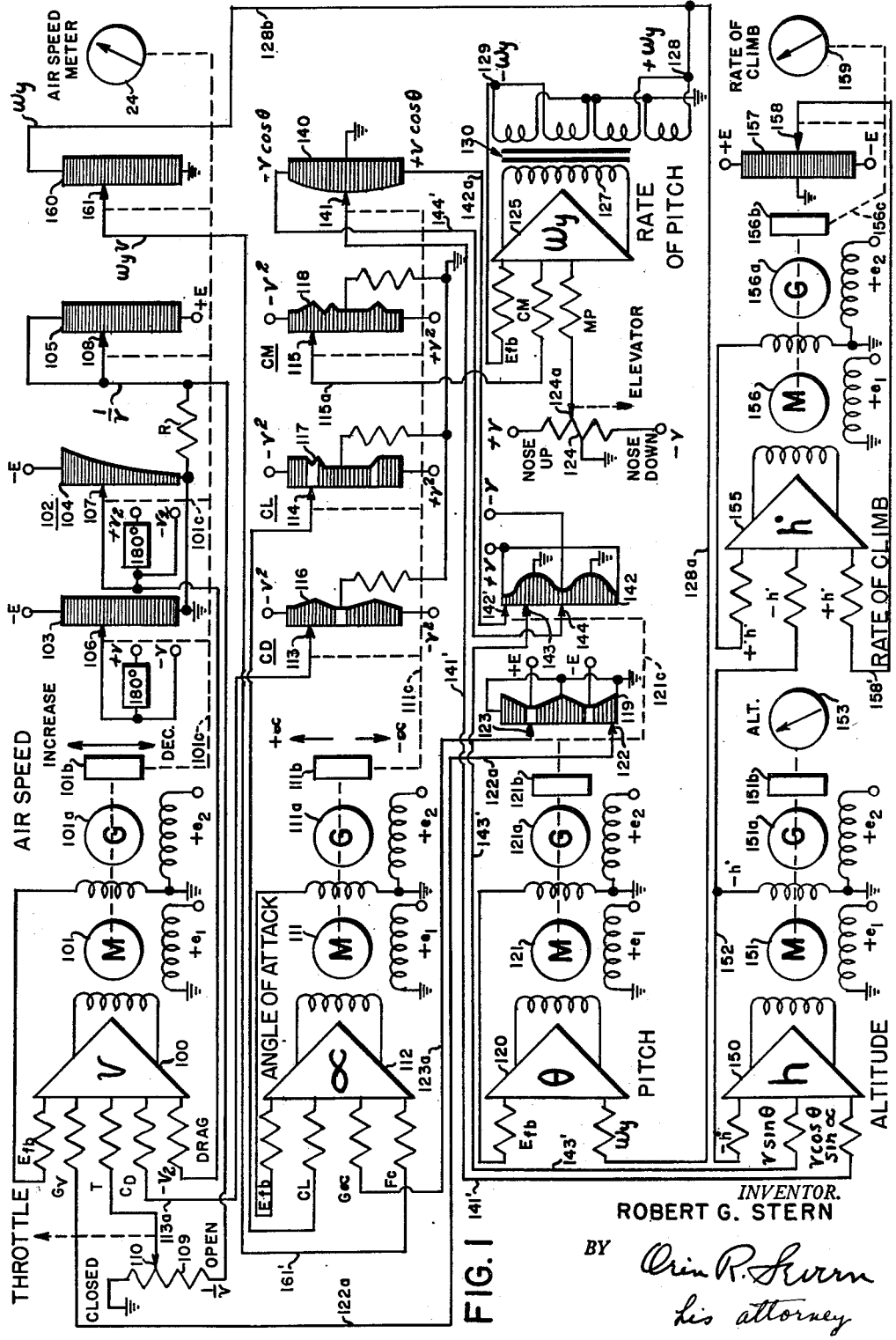

2,804,264

MOCK FLIGHT COMPUTING AND INDICATING SYSTEM FOR VERTICAL SYSTEM

Robert G. Stern, West Caldwell, N. J., assignor to Curtiss-Wright Corporation, a corporation of Delaware Application May 18, 1954, Serial No. 430,519

3 Claims. (Cl. 235—61)

This invention relates to ground-based mock flight computing systems for representing and indicating various simulated flight conditions, and in particular to electronic computing systems of the inter-acting-systems type operable in response to the operation of mock aircraft controls for indicating vertical system factors such as rate of climb and altitude.

Ground-based mock flight computing systems of the aforesaid electronic type have been developed for translating movement of mock aircraft controls by a student into flight and navigation instrument readings. A system of this character is disclosed in my Patent No. 2,731,737, granted January 24, 1956, for "Aircraft Training Apparatus for Simulated Landing and Related Maneuvers."

The instrument readings or indications of such apparatus, particularly when used for training aircraft personnel, should reflect faithfully the flight characteristics of the particular aircraft that is represented, especially with respect to the vertical system involving climb and dive rates and altitude.

One of the primary deficiencies in the operation of ground-based flight training apparatus is a lack of realism in the response of certain instruments to pilot manipulation of the controls. In the longitudinal system, for example, referring to the longitudinal "X" axis of the aircraft, the readings of the rate of climb indicator and the altimeter are often not properly correlated and therefore these flight factors are not realistically represented. For example, in actual aircraft when the pilot moves the elevator abruptly, the aircraft instrument indicating rate of climb does not respond instantly but instead has a characteristic lag. However, this is not the case with the altimeter which responds much more promptly to changes in vertical air speed. Accordingly, where these factors are computed in ground-based apparatus so that the altimeter servo system is dependent on the operation of the rate of climb system, the indication of the altimeter will be erroneous and misleading except of course for the steady-state condition.

Since one of the primary purposes of ground-based flight training apparatus is to teach the trainee pilot, and also to "refresh" experienced pilots, in the proper evaluation of control derivatives or rates, integrated factors, etc., it is essential that the flight stability of the training apparatus both in static and dynamic action be that of the parent aircraft. That is, it must have the same controllability, as reflected in the instrument readings, as the actual airplane itself.

The principal object therefore of the present invention is to provide improved ground-based flight training and computing apparatus that is capable of more accurately representing the static and particularly the dynamic responses of the aircraft in its vertical system where variations in vertical airspeed are involved.

A further object of the invention is to provide in apparatus above referred to, improved means for energizing the electrical systems representing rate of climb and altitude so that the characteristic lag in the rate of climb system can be simulated without affecting the altitude system, which in turn can be independently regulated for its characteristic response.

In accordance with the present invention a flight computing system of the inter-acting servo type such as that generally disclosed in my aforesaid Patent No. 2,731,737, is provided with electrical computing systems, such as servo motor systems, for representing rate of climb and altitude respectively, and the altitude system is energized by potential representing vertical air speed independently of the rate of climb system so as to provide accurate simulation of individual characteristic response of both the rate of climb indicator and altimeter.

Figure 2:
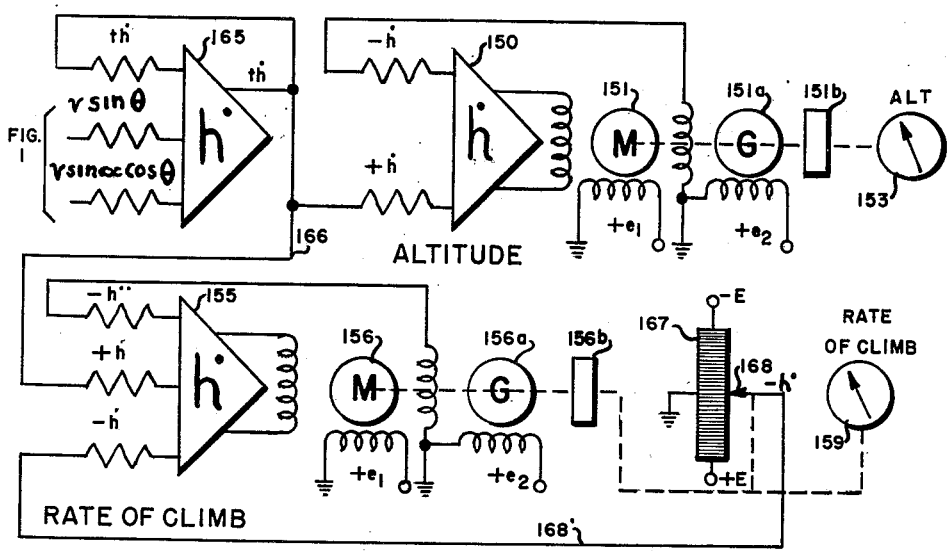

Referring to the drawings, Fig. 1 thereof is a diagrammatic illustration of a mock flight computing and indicating servo system embodying the present invention for the vertical mode of the airplane, and Fig. 2 is a similar illustration of a part of the computing system showing a modified form of the invention.

A so-called "vertical system" involving for simplicity but elevator and throttle control will first be described in connection with Fig. 1 for computing air speed. According to well-known principles of aerodynamics air speed ($v$) is a function of engine thrust (T) which is always positive (except for propeller drag when idling in flight below about 1200 R. P. M.), gravity (G) which may be either positive or negative depending on whether the aircraft is in a dive or climb, and drag which is of course negative. Drag may be considered as having two components, (1) constant coefficient drag which varies as the square of the air speed $v^2$, and (2) drag expressed by the variable coefficient $C_D(\alpha)$ which varies with the angle of attack ($\alpha$), i. e., the angle between the chord of the wing and the air stream.

Referring now to Fig. 1, it will be assumed that a plurality of A. C. voltages representing various values of thrust, gravity and drag respectively, according to the instantaneous polarity and magnitude of the respective voltage are fed separately into a summing amplifier diagrammatically indicated at 100 included in a servo system designated "air speed." Such amplifiers are well-known in the art for algebraically summing a plurality of separate A. C. voltages of varying magnitude and polarity. The output of the amplifier 100 is used to control an automatic balancing servo network including a two-phase motor 101, the control phase of which is energized by the amplifier output as illustrated and the other phase by a constant reference A. C. voltage $+e_1$. The operation of this type of motor is well known, the rotation being in one direction when the control and reference voltages in the respective phases have the same instantaneous polarity, and in the opposite direction when the instantaneous polarity of the control voltage is reversed with respect to the reference voltage, the rate of rotation in both cases depending on the magnitude of the control voltage. The motor drives a two-phase feed-back generator 101a also having one phase winding energized by an A. C. reference voltage $+e_2$, the other phase winding generating according to the motor speed a feed-back voltage $E_{fb}$ for purposes of rate control hereinafter described. The motor also serves to gang-operate through a gear reduction train 101b the contacts of a potentiometer system generally indicated at 102; also the pointer of the mock air speed meter 24 is directly positioned through the motor drive mechanism by suitable mechanical connections 101c between the motor and the driven elements as indicated by dotted lines.

The individual potentiometer resistance elements may be of the well-known wound card type and are of circular or band form but are diagrammatically illustrated in a plane development for clearness. Each potentiometer is shaped or contoured so that the value of the derived voltage at the potentiometer contact bears a certain relationship to the linear movement of the slider contact depending on the particular function of the potentiometer, and has a voltage impressed across its terminals depending in instantaneous polarity and magnitude also on the function of the potentiometer. In the present invention the contour of all functional potentiometers represents the derivative of the function represented.

Referring again to Fig. 1, the potentiometer 104 which has a squared function, is energized at its upper terminal representing maximum air speed by a negative voltage $-E$ and is grounded at its lower end so that the derived voltage at the slider contact 107 represents $-v^2$ and therefore is also representative of the constant coefficient drag previously referred to. Accordingly, this voltage may be used as one of the inputs of the air speed summing amplifier 100 tending to oppose the positive thrust input voltage (T), the arrangement being such that when the effects of all input voltages to the amplifier balance out, i. e. during a period of no change in air speed, the output of the amplifier is zero and the motor 101 is de-energized. Any change in the input voltages tending to unbalance the system, either in a positive or negative direction, such as for example in level flight during a change in throttle setting when the thrust and drag voltages are unequal, causes operation of the motor 101 in a corresponding direction to move the potentiometer contacts toward a new balance position wherein newly derived voltages tend to restore balance of the motor inputs.

For the purpose of deriving a voltage proportional to air speed $v$, the linear potentiometer 103 is energized by a voltage $-E$ and the slider contact 106 is positioned according to the magnitude of air speed. This derived voltage is used in another part of the system to be described.

The thrust voltage is shown as derived from the setting of the engine throttle potentiometer 109, the contact 110 of which is directly adjusted by the pilot to simulated throttle control. This potentiometer is energized by a voltage taken from the contact 108 of potentiometer 105 that is also energized at its lower terminal by a voltage $+E$, the upper terminal being grounded through a resistance R and also directly connected to contact 108 for deriving a voltage proportional to the reciprocal of air speed $$\frac{(1)}{v}$$

so as to correspond with the relationship $$T = \frac{H.\ P.}{v}$$

which is simply the basic equation $$H.\ P. = \frac{ft.\text{-}lb.}{sec.} = vT$$

It will therefore be seen that the thrust input voltage corresponds generally to the delivered engine power as determined by throttle setting and air speed.

For the purpose of deriving a voltage representing combined functions of air speed and another flight variable for use in the computing system hereinafter described, another potentiometer 160 is controlled by the air speed servo so that the derived voltage at slider 161 represents the product of air speed and the other variable (rate of pitch) which corresponds to the voltage energizing the potentiometer.

The drag coefficient input $C_D$ for the air speed system varies, as above indicated, with the angle of attack $\alpha$. Accordingly, another servo system designated "angle of attack $(\alpha)$" is provided for deriving a set of voltages corresponding to certain factors variable with angle of attack. A two-phase motor 111 (similar to motor 101) of the angle of attack system is energized by the output of a summing amplifier 112 in the manner above described for driving a feed-back generator 111a and for gang-operation of the contacts 113, 114 and 115 of potentiometers 116, 117 and 118 respectively. These potentiometers are for the purpose of calculating the drag coefficient $C_D$, the lift coefficient $C_L$ and the moment coefficient $C_M$ respectively.

In addition to the aforesaid potentiometers, another potentiometer 140 is provided in the angle of attack servo system for the purpose of calculating a component of vertical air speed for purposes hereinafter described. The slider contact 141 of this potentiometer is gang-operated as indicated with the other contacts 113, etc. The potentiometer has a grounded center tap and is energized at its opposite terminals by voltages representing a combined function of air speed and pitch attitude derived from the pitch servo system presently described.

The inputs of the $\alpha$ amplifier 112 include voltages representing gravity, the lift force ($C_L$) and centrifugal force ($F_c$) due to pitching. These inputs will be explained shortly.

The drag as related to angle of attack may be expressed as $$D = c_D(\alpha)\rho\frac{v^2 S}{2}$$

where D is the drag in pounds, $\rho$ is the density of air, $C_D(\alpha)$ is the drag coefficient and S is the projected wing area. Therefore drag can be considered a function of $v^2$, i. e., air speed squared. For representing this relationship the potentiometer 116 is appropriately contoured and energized at its opposite terminals by a voltage $-v^2$ taken from the potentiometer 104 of the air speed system. The mid-part of potentiometer 116 is grounded at the angle of attack where the drag coefficient $C_D(\alpha)$ is zero and contact 113 is connected by conductor 113a to the air speed amplifier 100. Accordingly, the derived voltage at contact 113, since it varies with change in angle of attack, generally according to the above relationship can be used as an input $C_D$ to the air speed amplifier. The gravity input $(\theta)$ depending on the pitch attitude of the aircraft involves additional servo systems that will be presently described.

The inputs to the angle of attack $(\alpha)$ amplifier 112 will now be considered. The gravity factor which as above pointed out is affected by climb and dive attitudes may be divided into two components which are fed to the angle of attack and air speed amplifiers 112 and 100 respectively. In practice these gravity inputs are 90° components, i. e. the air speed component is along the flight path and the angle of attack component is perpendicular thereto. In the present illustration the $v$ and $\alpha$ gravity components are derived by a pair of contacts 122 and 123 from the potentiometer 119 of the "pitch" $(\theta)$ servo system indicated, the pitch amplifier 120 in turn being energized to operate the motor 121, etc., from a "rate-of-pitch" system presently described. The pitch potentiometer 119 is suitably contoured (cosinusoidal in the present instance) and grounded at points 180° apart to represent both normal and inverted level flying, and the potentiometer is energized at points intermediate the grounded points by voltage $-E$ and $+E$ representing climb (negative) and dive (positive) gravity values respectively. The derived voltage at contact 122 represents the gravity component $-W \sin \theta$ which (at low angles of attack) represents the effect of aircraft weight in increasing or decreasing thrust and hence air speed, and is fed by conductor 122a to the $v$ amplifier 100. The derived voltage at the contact 123, which is spaced 90° from contact 122 represents the gravity component $W \cos \theta$ to be supported by lift derived through angle of attack and is fed by conductor 123a to the $\alpha$ amplifier 112.

The pitch servo system also includes a consinusoidal potentiometer 142 that is energized as indicated according to air speed for deriving at the 180° spaced slider contacts 142' and 144 oppositely phased component voltages $+v \cos \theta$ and $-v \cos \theta$ respectively. These voltages are used to energize the angle of attack potentiometer 140 previously referred to so that the resulting derived voltage at contact 141 represents a component of vertical air speed, namely, $v \cos \theta \sin \alpha$. This voltage and the voltage $v \sin \theta$ derived from the pitch potentiometer 142 at contact 143 are led by conductors 141' and 143' respectively to an altitude (h) system hereinafter described. The resultant of these two voltages, namely $v \sin \theta - v \cos \theta \sin \alpha$, represents the vertical air speed vector $v \sin (\theta - \alpha)$ as can be readily demonstrated, assuming $\alpha$ to be small.

Referring again to the angle of attack system, the lift L (in pounds) may be expressed by the formula $$L = C_L(\alpha) \rho \frac{v^2 S}{2}$$

where $C_L(\alpha)$ is the coefficient of lift. Therefore lift also is a function of air speed squared and depends on the type of aircraft simulated. Accordingly, the potentiometer 117 of the $\alpha$ system for determining lift coefficient is appropriately contoured for the coefficient $C_L(\alpha)$ of the particular airplane simulated and is grounded at its mid-portion at the value of angle of attack at which the lift coefficient is zero, and is energized at its upper and lower terminals by voltages $-v^2$ and $+v^2$ respectively derived from the air speed potentiometer 104. The instantaneous positive value of $v^2$ may be suitably obtained by means of a 180° phase shifter as indicated. Accordingly the contact 114 of the potentiometer 117 derives a lift force voltage which is applied as an input to the $\alpha$ amplifier 112. There is also an input to the angle of attack system representing centrifugal force (Fc) and this input is derived from potentiometer 160 of the air speed servo system above described, centrifugal force corresponding to the product of $\omega_y$ and $v$.

The inputs to the "rate of pitch" system include a so-called pitching moment input derived from the potentiometer 118 of the angle of attack system. This pitching moment expressed as $$M = C_M(\alpha) \rho \frac{v^2 S}{2}$$

is also a function of air speed squared. The potentiometer 118 is grounded at its mid-portion at the angle of attack where the pitch moment is zero and is energized by voltages $-v^2$ and $+v^2$ as in the case of potentiometer 117, and is also appropriately contoured so that the pitching moment voltage at the slider contact 115 varies according to the desired characteristics of the particular airplane. This voltage is fed by conductor 115a to the summing amplifier 125. The other input (Mp) of amplifier 125 represents the pitching moment in ft.-lbs. produced by the pilot-operated elevator control tending to cause pitching and is derived from the elevator potentiometer 124 that is in turn energized according to a function of air speed by voltages $+v$ and $-v$. The mid-portion of the potentiometer is grounded to represent approximately level flying or zero pitch. Accordingly the slider contact 124a of the elevator potentiometer selects a voltage that may be represented as the pitching moment (Mp) in foot-pounds and that is fed to the rate of pitch amplifier 125. It is to be noted that in the case of the foregoing circuits a positive (+) designated signal increases air speed, changes angle of attack, rate of pitch and pitch in the conventionally positive direction.

The output of the rate of pitch summing amplifier 125 is a voltage representing the computed value of rate of pitch. In order to use this voltage properly in the computing system, the amplifier output energizes the primary winding 127 of a transformer 130 the secondary winding of which produces oppositely phased voltages at terminals 128 and 129 representing respectively $+\omega_y$ and $-\omega_y$. The voltage $+\omega_y$ is fed by conductor 128b to the air speed potentiometer 160 for deriving the centrifugal force voltage Fc as previously stated. Also this voltage is used as an input (conductor 128a) for the pitch integrating system above referred to. The voltage $-\omega_y$ is used as a feed-back voltage for the amplifier 125.

The time integrated value of $\omega_y$ represents the pitch attitude or angle ($\theta$) of the aircraft. This integrating operation is performed according to the output of the pitch amplifier 120 by means of the pitch servo motor 121 and feed-back generator 121a. The pitch servo provides the two gravity components above referred to (potentiometer 119) and also, through the servo shaft position the instant angle of pitch. If desired, the pitch element of an attitude gyro can be operated from the pitch motor 121 in the manner indicated in Fig. 2.

It is also to be noted that the variation in the various forces and moments such as gravity, lift, centrifugal force, thrust, drag, pitching moment and the like are accomplished by the change in contact brush position on the respective potentiometers together with variation in the potentiometer energizing voltage, whereas the relative magnitude of each of the aforesaid forces and moments is determined by the value of the input resistance to the various amplifiers. As a specific example, the relative magnitude of lift is affected by the values of air density ($\rho$) and the constant factor $$\frac{S}{2}$$

In the present illustration $\rho$ is also considered a constant and hence these terms determine the resistance value of the input indicated at $C_L$ to the amplifier 112. Lowering the value of the resistance increases the relative magnitude of the above constant.

In accordance with the present invention, simulation of rate-of-climb and altitude instrument readings is made more realistic by improved circuitry inter-relating the rate-of-climb and altitude systems and the main computing system. Referring first to theoretical considerations, the exact equation for rate-of-climb ($\dot{h}$), in terms of true air speed (V_T), angle of attack ($\alpha$), angle of side-slip (B), pitch angle ($\theta$) and roll angle ($\varphi$) is:

$$\dot{h} = V_T (\cos B \cos \alpha \sin \theta - \cos B \sin \alpha \cos \varphi \cos \theta - \sin B \sin \varphi \cos \theta)$$

For present purposes it is sufficient to consider simply the longitudinal, or vertical system, i. e., assuming that $B = \varphi = 0°$. Also, since the angle $\alpha$ is small, the term $\cos \alpha$ may be considered for practical purposes as unity. The simplified equation now becomes:

$$\dot{h} = V_T (\sin \theta - \sin \alpha \cos \theta)$$

The equation for altitude is simply $h = \int \dot{h} dt$. There is disclosed in my aforesaid Patent No. 2,731,737 rate-of-climb and altitude computing systems wherein the characteristic responses of the respective indicators are simulated independently of each other. The present invention comprises other improved circuitry for accomplishing the same general result. Prior systems followed the logical mathematical approach by; first, computing the vertical airspeed and producing vector voltages; second, operating the rate-of-climb system and indicator by said voltages; and third, operating the altitude system and altimeter from the rate-of-climb system. This introduces all the lag of the rate-of-climb system into the altitude system, thereby producing unrealistic instrument readings, particularly for transient conditions involving material changes in vertical air speed. In accordance with the present invention, each system is energized so that it can be individually adjusted, without reference to the other, to produce the desired response characteristic.

Referring now to the altitude (*h*) system, the servo amplifier 150 is connected to the servo motor 151 for driving the feed-back generator 151*a* that is connected through a gear box 151*b* to an indicator 153 representing altitude.

The direct inputs to the altitude amplifier 150 include the vertical air speed component voltages $v \sin \theta$ and $v \cos \theta \sin \alpha$ above referred to, the summation of which represents the vertical air speed vector that in turn is integrated to represent altitude.

Since the time integration of vertical air speed or rate-of-climb is altitude, the altitude servo functions simply as an integrating system.

It will now be apparent that by reason of the direct energization of the altitude system by the vertical air speed component voltages, the characteristic fast response of the altimeter can now be obtained without reference to or limitation by the rate-of-climb servo system.

The rate-of-climb indicator, which has a slower response can, if desired, be simulated by operating the rate-of-climb system directly from the altitude system as shown in Fig. 1; or as shown in Fig. 2 a summing amplifier can be used to compute vertical air speed and the resulting voltage used simultaneously to energize both the rate-of-climb and altitude systems so that each can be regulated independently of the other.

In Fig. 1, the $\dot{h}$ servo amplifier 155 is energized from the *h* generator feed-back circuit 152, thereby providing an input voltage corresponding to the first derivative of *h*, i. e., $$\frac{dh}{dt} \text{ or } \dot{h}$$

The motor-generator set 156—156*a* functions in the usual manner and drives through gear reducer 156*b* and connection 156*c* the slider 158 of the "answer" potentiometer 157 which provides a position voltage $+\dot{h}$ on conductor 158' for the servo. The rate-of-climb indicator 159 is also driven from the servo motor as indicated. Accordingly, the $\dot{h}$ system can readily be adjusted by means of its feed-back generator and associated circuits to simulate the characteristic slower response of the rate-of-climb indicator.

In Fig. 2, a summing amplifier 165 is additionally provided for separately computing vertical air speed. By this arrangement, it is unnecessary to match precisely the input resistors of parallel connected servo amplifiers. As shown, the input voltages for the $\dot{h}$ summing amplifier may be derived from the circuits of Fig. 1, namely conductor 143' ($v \sin \theta$) and conductor 141' ($v \cos \theta \sin \alpha$). The output voltage on conductor 166 represents vertical air speed and this voltage is fed by parallel circuits to the altitude servo amplifier 150 and the rate of climb servo amplifier 155 respectively. The *h* and $\dot{h}$ servo systems otherwise are generally as shown in Fig. 1, i. e. integrating and position servos respectively. Accordingly, the separate systems can be readily adjusted independently of each other for proper response characteristics. The system of Fig. 2 has several significant advantages, namely; the trigonometric inputs, i. e. component voltages are summed but once, thereby minimizing error; any lag inserted into the rate-of-climb system does not affect the altimeter reading; and since the generator voltages are fed only into the servo amplifiers that they directly affect, there is no problem of "drifting" generator voltages.

The use of the feed-back generators for rate control is particularly important, the pitch servo integrating system serving as an important example. If the motor 121 alone were relied upon to perform the pitch integrating operation the natural inertia of the driving mechanism would introduce such a large error that from a practical standpoint the system would not be useful. However, with the feed-back generator connected in the system as shown, the generated feed-back voltage $E_{fb}$ constitutes an input for the pitch amplifier and is of such phase relation to the summed or resultant input signal that it opposes the same, i. e. in the manner of degenerative or negative feed-back. With large gain in the control amplifier the speed of the motor according to well-known principles is therefore caused to have a linear speed response to the magnitude of the input signal, i. e. rate of pitch voltage, without lag or overshooting, thereby integrating both high and low rates of pitch with equal precision. It will be apparent that when the main input signal is reversed so as to operate the motor and generator in the opposite direction, the phase of the generated feed-back voltage is likewise reversed to oppose the input signal as before.

The operation of the interacting network in respect to the air speed meter reading will now be briefly described. In actual level flying for example when the throttle is opened wider the air speed increases and the nose of the aircraft lifts, the converse taking place during closing of the throttle. Referring to the drawing, as the throttle potentiometer contact 110 is moved downward for example toward the open throttle position, the derived input thrust voltage T for the amplifier 100 increases thereby unbalancing the air speed servo system and causing the servo motor 101 to run in a direction moving the potentiometer contacts 106, 107, etc., upward as shown toward increased air speed so that the following takes place in the air speed potentiometer system 102; (1) the derived air speed voltage $v$ increases, (2) the derived $v^2$ voltage increases as the square of air speed, (3) the derived voltage representing the reciprocal of air speed $$\frac{1}{v}$$

decreases, (4) the derived voltage representing centrifugal force $F_c$ increases, and (5) the air speed meter 24 indicates a higher air speed value. However the air speed cannot increase indefinitely because the constant coefficient drag increases with $v^2$ as does the $C_D(\alpha)$ drag. Also at the same time the thrust, which varies with the reciprocal of air speed, decreases as the new equilibrium is reached.

Now, as the values of both $v$ and $v^2$ increase, the angle of attack system is in turn unbalanced since the centrifugal force and lift coefficient inputs from the potentiometer 160 of the air speed system and from the potentiometer 117 of the angle of attack system, both of which are dependent on $v$ and $v^2$ respectively, are now increased. Also the gravity input from the pitch system is changed as will presently be described. Accordingly, the servo 111 starts running in a direction searching for a new balance position and finally moving the potentiometer contacts 113, 114 and 115 downward toward decreased angle of attack indication. As this operation progresses the derived voltages from the three $\alpha$ potentiometers 116, 117 and 118 are used as follows:

(1) The derived drag voltage (negative) from potentiometer 116 is used as an input ($C_D$) for the air speed amplifier and increases in magnitude so as to oppose the increased thrust voltage (positive) derived from the higher throttle setting above referred to.

(2) Since the wing lift of an aircraft must balance any centrifugal force and weight component acting perpendicular to the wing, the derived lift voltage ($C_L$) from potentiometer 117 must balance both the gravity factor $G_\alpha$ and the centrifugal force $F_c$. Assuming that the plane was initially in level flight, the centrifugal force is zero and hence the tendency of increased air speed is to reduce the angle of attack which will tend to become more negative. This tendency is opposed by a change in pitching moment.

(3) The derived moment voltage from potentiometer 118 which is an input ($C_M$) for the rate of pitch amplifier 125, becomes more positive with decreasing angle of attack and thereby causes an unbalance in the rate of pitch inputs to produce a new value of rate of pitch and hence, through the air speed potentiometer 160 a new centrifugal force voltage $F_C$ for the amplifier 112 which produces an equilibrium restoring tendency at the $\alpha$ servo. Concurrently the increase in voltage $\omega_y$ results in an increased input voltage at the pitch integrating servo system $\theta$. Accordingly, all four systems are now functioning in a combined computing and integrating operation necessary to determine the new air speed reading and pitch attitude.

As the pitch system is unbalanced toward a position of more positive pitch, i. e., climb, the derived voltages at potentiometer contacts 122 and 123 representing the gravity (weight) input components for the $v$ and $\alpha$ amplifiers respectively vary in magnitude, the $v$ component increasing and the $\alpha$ component decreasing in the present instance as it will be apparent that if the aircraft nose were pointed toward zenith the weight component in the direction of aircraft movement would then represent $-W$ and the weight component perpendicular to the wings, i. e. the $\alpha$ servo component would be zero. At intermediate aircraft attitudes the components are vectorially resolved.

The negative weight component ($-W \sin \theta$) to the air speed servo tends to reduce the maximum velocity the aircraft will reach with the increased throttle setting. At the same time the wing lift required is decreased due to decrease of the $W \cos \theta$ value ($G\alpha$) at the $\alpha$ amplifier 112. This allows a further reduction in angle of attack and additional reduction in the negative pitching moment voltage ($C_M$) to the rate of pitch amplifier 125 which in turn produces a more positive value of $\omega_y$ thus increasing the effect on the pitch and angle of attack servos until finally these servos have overrun and have produced too great a change in the weight components for equilibrium. Consequently there is dropping off of air speed. This in turn results in a decreased lift voltage ($C_L$) at the $\alpha$ amplifier 112 so that the angle of attack is increased and a larger negative pitching moment voltage is produced at potentiometer 118 for the $\omega_y$ amplifier 125. The value of $\omega_y$ decreases to control the pitch integrating serve so as to reduce the pitch attitude until it finally becomes negative. The $W \sin \theta$ component ($G_V$) to the air speed servo has now become positive, thereby aiding thrust so that the air speed once more increases and the cycle reverses eventually damping itself to a final equilibrium position consistent with the new throttle setting.

In the foregoing manner the damped wave path for vertical oscillation of an aircraft is reproduced so that the simulation is more realistic. The degree of damping of the wave path is dependent on the choice of the circuit constants including percentage of velocity feed-back, gear ratios, relative input magnitudes and the positions of potentiometer center taps.

Because of this vertical oscillation due initially to "nosing up" of the aircraft in response to opening of the throttle, there will of course be indications of vertical air speed, depending primarily on the air speed and pitch attitude as represented by potentiometer 142 of the pitch system. As previously pointed out, the derived voltage $v \sin \theta$, which represents a vertical vector, is modified by angle of attack at potentiometer 140 so that the resulting derived voltage represents $v \cos \theta \sin \alpha$ and this voltage is in turn subtracted from the pitch derived voltage at altitude amplifier 150 to represent the actual vertical component.

It has been assumed during the above explanation that the throttle setting only has been changed and that the elevator control remained in normal lever flight or neutral position. When the elevator control is adjusted, a derived voltage corresponding to the pitching moment is used for controlling a rate system, i. e. the rate of pitch system from which is derived a voltage used in connection with the air speed servo to produce a voltage representing centrifugal force. This force voltage is an input for controlling the angle of attack servo for deriving a rate input voltage of opposite sense but equal in magnitude to the first moment voltage. Also, this same force voltage controls the derivation of another input force voltage representing lift which has a polarity of opposite sense and builds up to offset the effect of the original force voltage. This illustrates in general how a balance is established between rate of pitch and angle of attack.

An elevator control operation will now be described in particular. When the elevator is moved toward a dive position for example, the contact 124a is lowered and the derived elevator potentiometer voltage representing pitching moment, assuming for example that the contact 124a was originally in a climb position, first decreases in magnitude to the level flight indication and then reverses in polarity and increases in opposite magnitude thereby unbalancing the rate of pitch system inputs so that a new value of $\omega_y$ opposite in polarity results. The servo 121 of the pitch system which is energized by the $\omega_y$ voltage rotates now in the direction toward negative pitch (dive) thereby increasing the derived voltage at contact 122, i. e. the weight component ($-W \sin \theta$) to the $v$ system becomes positive and acts to increase air speed. The motor 111 of the $\alpha$ system, which receives a control signal $F_C$ representing $v$ and $\omega_y$ now also rotates in the opposite direction toward negative $\alpha$. This last operation causes the $C_M$ voltage fed to the rate of pitch system to become more positive thereby tending to stabilize said system. Concurrently, the movement of the $\alpha$ servo has changed the $C_D$ potentiometer derived voltage at contact 113, thereby changing the drag input at the $v$ system tending to modify the air speed reading.

Since a dive attitude represents negative pitch, the contacts 143 and 144 of the pitch potentiometer 142 are positioned beneath the respective ground taps to derive negative and positive voltages respectively. Thus the polarity at the terminals of angle of attack potentiometer 140 is reversed so that the polarity of the derived voltage is also reversed for energizing the rate of climb servo in the negative or rate of dive direction. The resulting modified air speed voltage causes in turn modification of the derived voltages from the pitch potentiometer 142 and the angle of attack potentiometer 140 which represent the vertical components of air speed for energizing the rate of climb servo system. Thus, changes in angle of attack, pitch attitude and air speed are all reflected in the rate of climb reading at indicator 159. When the elevator control is relaxed for "flattening out" the dive, the rate of pitch system is unbalanced by the decrease in the input voltage $M_P$ so as to produce a more positive change or increase in both the centrifugal force voltage $F_C$ and the rate of pitch voltage. Since these voltages tend to operate both the angle of attack and pitch servos toward more positive values, the air speed is not only decreased as above pointed out but the vertical components of air speed are reduced due to operation of the rate of climb servo toward neutral as the inputs thereof decrease.

Consequently there is a repetition of the interaction above described among the four systems until the air speed, angle of attack and dive attitude correspond to the aircraft power and elevator position.

During the above described dive control operation the $\alpha$ system seeks a balance depending on the inputs representing respectively centrifugal force from the rate of pitch and air speed systems and the gravity component from the pitch system on the one hand, and the lift coefficient from the changed angle of attack on the other hand, the resultant of these inputs operating the motor 111 in the positive or negative direction as the case may be and becoming balanced when the rate of pitch and the pitch systems become stabilized.

In brief, the air speed meter reading and hence the vertical air speed and altitude readings in the system above described depends not only on the engine thrust component but also on retarding or modifying components that depend in turn on the angle of attack, rate of pitch and angle of pitch involving also the elevator control. A change in any one of the above factors or components necessarily affects the related systems generally tending to unbalance them so that in practice the complete system is continuously searching for a position of balance, thereby simulating the inherent aerodynamic equilibrium of aircraft.

It should be understood that this invention is not limited to specific details of construction and arrangement thereof herein illustrated, and that changes and modifications may occur to one skilled in the art without departing from the spirit of the invention.

What is claimed is:

1. In ground-based flight training apparatus having mock aircraft controls, a flight computing system comprising a plurality of inter-acting electrical systems responsive to said controls and representing flight factors including air speed, pitch, angle of attack, rate of climb and altitude respectively, the altitude system constituting integrating means and being directly energized by potential representing vertical air speed and produced jointly by the air speed, pitch and angle of attack systems, and simulated altimeter and rate of climb indicators controlled by the respective systems, said altitude system being adapted to produce a control potential representing the first derivative of altitude, and said rate of climb system being energized by said control potential, whereby simulation of the characteristic responses of the altimeter and rate of climb indicator of aircraft is effected.

2. In ground-based flight training apparatus having mock aircraft controls, a flight computing system comprising a plurality of inter-acting electrical systems responsive to said controls and representing flight factors including air speed, pitch, angle of attack, rate of climb and altitude respectively, the altitude system constituting integrating servomotor means and being directly energized by potential representing vertical air speed and produced jointly by the air speed, pitch, and angle of attack systems, and simulated altimeter and rate of climb indicators controlled by the respective systems, said altitude servo system having a generator for producing a control potential representing the first derivative of altitude, and said rate of climb system being energized by said control potential, whereby simulation of the characteristic response of the altimeter and rate of climb indicator of aircraft is effected.

3. In ground-based training apparatus having mock aircraft controls, a mock flight computing system comprising a plurality of inter-acting electric systems representing flight factors including air speed, pitch, angle of attack, rate of climb and altitude, the systems representing air speed, pitch and angle of attack being responsive to operation of a vertical air speed control by a student for jointly producing a plurality of voltages representing components of vertical air speed, a summing amplifier energized by said voltages for producing a single potential representing vertical air speed, the systems representing rate of climb and altitude including respective amplifiers having input circuits connected for simultaneous energization by said single potential whereby the characteristic response of the rate of climb indicator and altimeter of aircraft can be independently simulated.

References Cited in the file of this patent
UNITED STATES PATENTS

| | | |
|---|---|---|
| 2,560,528 | Dehmel | July 10, 1951 |
| 2,687,580 | Dehmel | Aug. 31, 1954 |
| 2,701,922 | Dehmel | Feb. 15, 1955 |